United States Patent [19]

Maddux

[11] 3,774,730

[45] Nov. 27, 1973

[54] TOOL HOLDER

[75] Inventor: Kenneth Carl Maddux, Cincinnati, Ohio

[73] Assignee: N L Industries, Inc., New York, New York

[22] Filed: Apr. 19, 1972

[21] Appl. No.: 245,329

[52] U.S. Cl. ................................. 188/1 B
[51] Int. Cl. ............................... F16f 7/10
[58] Field of Search ............. 188/1 B; 408/143

[56] References Cited
UNITED STATES PATENTS

| 3,601,229 | 8/1971 | Shurtliff | 188/1 B |
| 3,618,362 | 11/1971 | Hill | 188/1 B X |

*Primary Examiner*—Duane A. Reger
*Attorney*—Robert L. Lehmann et al.

[57] ABSTRACT

A tool holder is provided with vibration dampening means to eliminate chatter marks recorded on workpieces by a cutting tool attached thereto. The vibration dampening characteristics are provided by a high density member located within a longitudinal cavity in the tool holder. The dampening element moves in a direction which counters the normal resonant frequency cutting vibrations generated in the tool holder.

4 Claims, 2 Drawing Figures

PATENTED NOV 27 1973 3,774,730
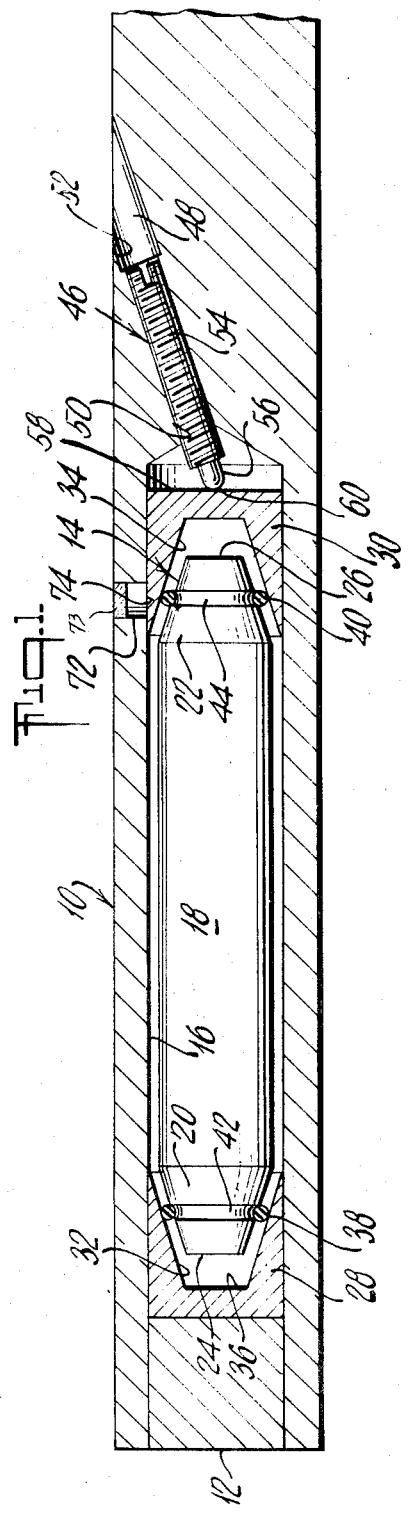
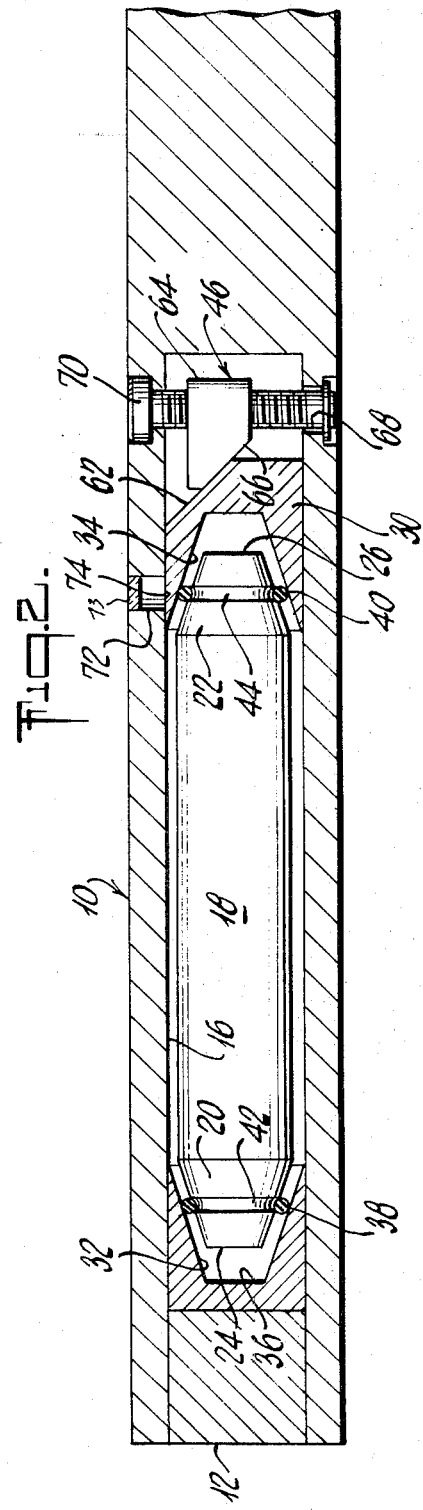

TOOL HOLDER

BACKGROUND OF THE INVENTION

Any vibratory motion between a cutting tool and workpiece will be recorded on the workpiece surface which may result in an unsatisfactory surface finish. Dimensional accuracy, tool life and machine life may also be adversly affected.

The causes of chatter can be traced to a static or dynamic structural weakness in the machine - tool, workpiece, metal cutting system. The deflection of the cutting tool system in many cases is the major cause of chatter since the tool holder will vibrate at its resonant frequency. In cutting systems for boring very deep or narrow holes, the cutting tool is mounted on a tool holder commonly referred to as a boring bar. These bars tend to be elongated and slender and tend to be rather easily excited or vibrated at their resonant frequency. Vibrations are transmitted to the workpiece via the cutting tool. A resultant chatter pattern is left on the workpiece, and in more extensive cases a hole may be so improperly cut as to render the workpiece worthless.

Several attempts have been made to perfect a tool holder which possesses adequate vibration dampening characteristics. One such attempt involves the use of sliding disks which, enclosed within the tool holder, move so as to counter the self excited vibrations in the tool holder dissipating the vibratory energy through friction losses.

The instant invention provides a unique concept in vibration dampening. The use of a high density member effectively dampens vibrations generated in the tool holder. Additionally, the system hereinafter described is adjustable so as to provide highly effective dampening over a range of frequencies. In addition to its superior dampening properties, the instant invention is very competitive, cost-wise, to manufacture.

SUMMARY OF THE INVENTION

A primary object of the present invention is the provision of a tool holder of superior vibration dampening characteristics.

Another object of the present invention is the provision of tool holder capable of dampening cutting vibrations within a range of resonant frequencies.

Yet another object of the present invention is the provision of a tool holder with superior dampening characteristics which is inexpensive to manufacture.

In accordance with the above designs, the present invention is preferredly embodied in a tool holder which includes vibration dampening means enclosed within a longitudinal cavity formed in the holder. An elongated, high density vibration dampening member is disposed within the cavity, which member is movable therewithin. As the tool holder vibrates during metal cutting, the dampening member moves universally within the tool holder. That movement causes forces which oppose the vibrations generated in the tool holder, effectively eliminating chatter on the workpiece due to the tool holder instability. Also provided within the cavity are resilient means urging the dampening member towards its non-vibratory state. The resilient means serves to transfer counter-vibrational forces to the tool holder, as well as to urge the dampening member toward its non-vibratory state.

Also provided in this system is an adjusting means. This means serves to either increase or decrease, between a maximum and minimum, the dampening frequency. As each resonant frequency of vibration requires a specific movement of the dampening member, with a simple adjustment, a single tool holder embodying the structure hereinafter described effectively dampens all resonant vibration frequencies within a given range.

DESCRIPTION OF THE DRAWINGS

FIG. 1 illustrates a cross-sectional view of a preferred embodiment of the present invention.

FIG. 2 illustrates a cross-sectional view of an alternate embodiment of the present invention.

DETAILED DESCRIPTION

Referring to FIG. 1, the present invention is embodied in a tool holder 10 such as a boring bar used for boring deep holes in workpieces. A cutting tool (not shown) can be mounted at section 12 which tool will bore a hole in a workpiece as it and the tool holder 10 enter the workpiece. The cutting dynamics produce resonant frequency vibrations which travel through the tool holder 10 affecting the stability of the cutting process. For this reason the tool holder 10 is provided with vibration dampening means 14 which will dampen the resonant frequency vibrations generated in the tool holder.

The vibration dampening means 14 is carried within the cavity 16 which is formed in the body of the tool holder 10. The dampening properties of the instant invention are accomplished by the dampening member 18. This member 18 is elongated and has tapered ends 20, 22 which terminate at the flat transverse faces 24, 26. As shown, the body of member 18 is generally cylindrical there being clearance between the cavity 16 and the cylindrical body. It has been found that a dampening member of high density, such as a heavy metal is uniquely suited in this design for effective vibration dampening. Furthermore, depleted or spent uranium provides exceptionally effective dampening and at the same time renders this material, which has previously been waste material subject of difficult disposition, uniquely useful.

Located within, and at the opposing ends thereof, are the front and rear retaining blocks denoted as 28 and 30. These blocks 28 and 30 each have a central chamber 32, 34 which is conical in shape, the elements of which are generally parallel to the elements of the tapered sections 20, 22. As here shown the blocks 28, 30 are aligned such that the chambers 32, 34 are open to each other. The chambers 32, 34 enclose the dampening member 18, but do not make srface contact therewith. Surface contact is prohibitted by the use of urging means, or resilient members 38, 40, known ocmmonly as "0" rings, which are fitted about grooves 42, 44 formed in the tapered sections 20, 22 of member 18.

In actual operation the vibration dampening is accomplished by the universal movement of the dampening member 18. Vibrations transferred to the tool holder 10 travel throughout the tool holder. These vibrations cause tool holder to flex or bend which can result in chatter marks recorded on a workpiece, or an improperly drilled hole. As a vibration passes through the tool holder 10 the dampening member 18 will move or bounce, in a direction which tends to counter the vibrational force. The dampening member 18 variously compresses resilient members 38, 40 between itself and chambers 32, 34. This interaction represents a transfer of forces to the tool holder 10, which forces generally oppose the vibrational forces present at that time in the tool holder. The net effect is a vector sum of zero vibrational forces present in the tool holder. In other words the tool holder is prohibited from bending, and as a result, chatter marks will not be recorded on the workpiece surface. Additionally, long thin holes can now be easily cut without fear that excessive bending will break a thin tool holder.

The choice of a heavy metal for this task provides obvious benefits. A large counter vibrational force can be exerted with a small sized dampening member 18. Also, a heavy member is able to produce a considerable force with only a small movement. As previously stated, depleted uranium is uniquely adapted for this use. As one of the heaviest substances per unit volume it provides excellent vibration dampening. Heretofore, it has been almost exclusively a waste material in search for methods of disposal. In the environment of the instant invention it becomes a valuable substance.

At this point attention is turned to the resilient members 38, 40 which are fit about grooves 42, 44 formed in tapered sections 20, 22. At all times these resilient members are in contact with the walls of chambers 32, 34. This means that member 18 is not free to bounce off the walls of the chambers but rather its movement is confined to the universal travel permitted by the compressed resilient members 38, 40. As the member 18 moves toward chamber 32 it compresses resilient member 38. in accordance with the strength of the causative vibration, that resilient member will be compressed only so much as needed to halt the thrust of member 18. At the same time resilient member 40 is relaxed to the same degree that member 38 is compressed. As a result, resilient member 38 now acts on member 18 thrusting it back toward its undampened condition, thereby relaxing its compression to the same degree that resilient member 40 is compressed. In such a manner the dampening means 14 is readied to dampen the next vibration excited by the cutting tool, the sequence of movements being similar. The member 18 also moves with up and down motion. The sequence of spring compression and depression is essentially the same as that for horizontal movement. At all times during the hereinbefore described movements, the resilient members are in contact with their respective chamber 32, 34 walls. In fact, these members actually suspend member 18 which does not touch, at all, the walls of cavity 16 but rather bounces within the prohibited movement allowed by the resilient members 38, 40.

The invention thus far described will provide effective dampening for only a single vibration frequency. Obviously, it is desirable for a single tool holder to be effective over a range of frequencies. In other words, a method must be provided which will adjust the compression of resilient members 38, 40. This objective is accomplished by rendering the rear retaining block 30 movable. As block 30 is urged toward fixed block 28, the resilient members 38 and 40 are compressed. This compression renders the dampening means effective for dampening high frequency vibrations as the members 38, 40 provide greater thrust forces on member 18. As block 30 is moved away from block 28, the compression of resilient members 38, 40 is relaxed rendering the dampening means 14 effective for dampening low frequency vibrations since the thrust forces provided by resilient members 38, 40 is now quite low, and the permitted travel of member 18 is fairly large. The dampening means is then effective for dampening, between a specified maximum and minimum vibration frequency. These limits are determined by size and diameter of member 18, resiliency of the "O" rings, and the material chosen for use as the dampening member. Obviously, the minimum frequency is that at which the resilient members just touch the blocks 28, 30. On the other hand, the maximum frequency that can be dampened coincides with the situation where the compression in the resilient members 38, 40 is so great that the member 18 is rendered virtually immobile.

The adjustability charactaristic of retaining block 30 is accomplished by the provision of an adjusting means 46. A hole 48 is formed in the tool holder body 10 at an acute angle to the tool holder axis. That hole 48 is partially threaded 50 and is counterbored 52. A screw 54 is received in the hole 48 and threadably engages at section 50 such that the tip 56 of that screw extends into the cavity 16. The tip of screw 54 contacts the slide surface 58 of block 30 at section 60. As the screw 54 is rotated, the tip 56 slides up or down along surface 58 and adjusts the position of block 30. As the screw 54 travels out of that hole, the resilient members are relaxed. Thus, the adjustments necessary to establish a particular dampening frequency are simply carried out.

Referring to FIG. 2, an alternative adjusting means 46 is shown. The rear retaining block 30 has an angular slide surface 62 formed thereon. A wedge or guide 64 by means of slide surface 66, slides along surface 62. An access hole 68 is formed in body 10 and extends completely through that body, which hole also extends through guide 64. A screw 70 extends through the hole 68 (including the guide), and only the hole in the guide 64 is threaded. As the screw 70 is turned the guide 64 moves up or down the screw 70, which screw does not move vertically within the hole 68. As the guide 64 moves, so moves the retaining block 30 thereby adjusting the dampening frequency.

In both adjusting embodiments the rear retaining block 30 is moved to a position at which it will dampen at the resonant vibration frequency of the boring bar 10. Each bar will vibrate at certain frequency, irrespective of cutting speed, dependent only upon the position at which the bar is held along its length. In other words, the greater the bar length the lower will be the resonant vibration frequency and conversly, the shorter the bar length, the higher the vibration frequency. Therefore, the instant invention is effective to dampen resonant frequencies which will vary in accordance with the positioning of the bar in a tool stand.

Another aspect of the present invention is the provision of a monitoring means to indicate the particular dampening setting. For such a function the hole 72 is formed in body 10 and is adjacent block 30. A groove 74 is formed on block 30 and is visible through window 73. The position of groove 74 indicates the vibration dampening frequency of the dampening means 14 for any particular adjusting means 46 setting.

As has been seen, the present invention provides a highly useful and efficient way of eliminating chatter in a cutting process. It is characterized by an economy of moving parts as well as relative ease of manufacture and use. It is highly effective in performing its primary function, that of vibration dampening, enabling the production of chatter-free workpieces. Additionally, it provides a use for what heretofore has been a waste material of difficult disposition.

It is obvious that many variations may be made in the details of the instant invention without departing from the spirit and scope of the appended claims.

What is claimed is:

1. A tool holder comprising a supporting body having an elongated cylindrical cavity therein of substantially uniform diameter, a portion of said body being constructed and arranged to support a tool, vibration dampening means for dampening vibrations transferred to said body by said tool, said vibration dampening means comprising an elongated substantially cylindrical dampening member formed of relatively high density material each end of said dampening member being tapered, said dampening member being dimensioned to have substantially universal movement within said cavity in directions to counter vibrations of said tool holder, and mounting means arranged at opposite ends, respectively, of said cavity for mounting said dampening member therein in a manner to transmit the counter vibration movements of said dampening member to said tool holder, said mounting means comprising first and second 0cylindrical blocks corresponding in diameter to the diameter of said cylindrical cavity, each block having an inwardly facing frusto-conical cavity, one of said blocks being fixed in said cylindrical cavity and the second block being arranged to move longitudinally therein, said blocks spaced apart sufficiently to accomodate the tapered ends of said dampening member in the respective frusto-conical cavities of said blocks, and resilient means circumscribing the tapered ends of said dampening member arranged to support said tampered ends in said frustoconical cavities in spaced relationship thereto.

2. A tool holder according to claim 1, wherein each tapered end of said dampening member is provided with an annular groove and said resilient means comprises an "0" ring mounted in the annular groove.

3. A tool holder according to claim 2, wherein vibration frequency adjusting means is mounted in said tool holder in cooperative engagement with said movable block for moving the latter longitudinally in said cavity thereby to vary the compression of the resilient means mounted between the tapered ends of said dampening member and the corresponding frusto-conical cavities of said mounting blocks in accordance with maximum and minimum vibration frequencies of said tool holder.

4. A tool holder according to claim 3 wherein said adjustable second block is provided with an index mark and said tool holder is provided with a sight-aperture arranged to afford a view of the index mark of said adjusable block for monitoring vibration frequency settings of said dampening member.

* * * * *